United States Patent [19]
Buehler et al.

[11] Patent Number: 5,925,823
[45] Date of Patent: Jul. 20, 1999

[54] ALPHA-PARTICLE GAS-PRESSURE SENSOR

[75] Inventors: Martin G. Buehler, La Canada; L. Douglas Bell, Sunland; Michael H. Hecht, Los Angeles, all of Calif.

[73] Assignee: California Institute of Technology, Pasadena, Calif.

[21] Appl. No.: 08/897,233

[22] Filed: May 30, 1997

Related U.S. Application Data

[60] Provisional application No. 60/019,089, Jun. 3, 1996.
[51] Int. Cl.$^6$ ................................. G01L 7/00; G01T 1/18
[52] U.S. Cl. ............................. 73/700; 250/382; 340/629
[58] Field of Search ................................ 73/700; 250/382; 340/629

[56] References Cited

U.S. PATENT DOCUMENTS 3,792,254  2/1974  Lecuyer ................................ 250/382
4,336,455  6/1982  Bryant ................................ 340/629 X

FOREIGN PATENT DOCUMENTS 74650  3/1969  German Dem. Rep. .

*Primary Examiner*—George Dombroske
*Assistant Examiner*—Paul D. Amrozowicz
*Attorney, Agent, or Firm*—Fish & Richard

[57] ABSTRACT

Gas pressure in a chamber is determined by injecting alpha particles. The alpha particles ionize the gas. By determining a number of gas ions which are ionized, the pressure of the gas in the chamber can be determined.

4 Claims, 7 Drawing Sheets

ALPHA-PARTICLE GAS-PRESSURE SENSOR

CROSS REFERENCE TO RELATED APPLICATIONS

This application claims the benefit of U.S. Provisional application Ser. No. 60/019,089, filed on Jun. 3, 1996.

ORIGIN OF THE INVENTION

The invention described herein was made in the performance of work under a NASA contract and is subject to the provisions of Public Law 96-517 (35 USC 202) in which the Contractor has elected to retain title.

FIELD OF THE INVENTION

The present invention relates to a gas pressure sensor which determines pressure of a gas using interaction with alpha particles.

BACKGROUND OF THE INVENTION

Gas pressure is sensed for a number of different applications. A common way of sensing gas pressure is to use a diaphragm which deforms in accordance with gas pressure, and a transducer to transduce that gas pressure-induced deformation into a usable signal.

Currently-available gas pressure sensors are large and consume large amounts of power. The deflection of the diaphragm must be measured by a separate device.

Currently-available devices include magnetic reluctance sensors, capacitance sensors and strain gage techniques. One use for gas pressure sensors includes measuring atmospheric pressures in outer space, or on a planet such as Mars. An understanding of Martian atmospheric pressure will help to model its atmosphere. However, boosting gas sensors into space require specialized considerations. Precise time series measurements and long term stability may be crucial. Such devices may need to operate over an extreme temperature range. The sensors must be robust, in order to allow them to withstand the launch vibration and a hard landing which may be in excess of 20,000 times the force of the earth's gravity. The standard pressure sensor, such as a diaphragm gage, may be unable to stand such stress.

The sensor must also be small: a preferable sensor should have 20 mm of linear dimension and a mass of less than 50 grams. However, many of the previous mechanical sensors required a trade off between the physical size of the diaphragm and the sensing resolution.

SUMMARY OF THE INVENTION

In view of the above, the present invention defines using a detector which monitors the ability of alpha particles to ionize gas molecules. The inventors have found that the ion current produced in this way will be proportional to the gas density. Hence this system allows detecting gas density using substantially solid state components.

DESCRIPTION OF THE PREFERRED EMBODIMENT

Figure 1:
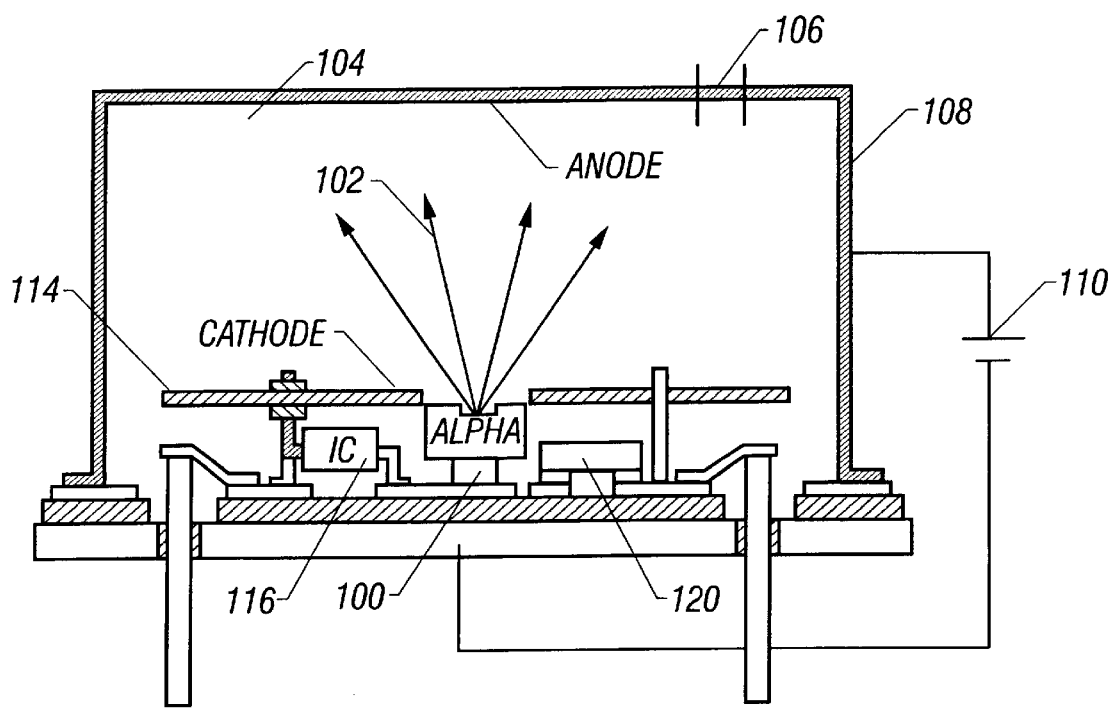
FIG. 1 shows an embodiment of the alpha gas pressure sensor.

An embodiment of the invention uses the system shown in FIG. 1. Alpha particle source 100 produces alpha particles 102 into ionization chamber 104. The ionization chamber 104 includes an orifice 106 which opens the inside of ionization chamber to atmospheric pressure. Hence, ionization chamber 104 includes gas (air) at atmospheric pressure.

Alpha particle source 102 produces alpha particles in a substantially uniform pattern, which are directed into the ionization chamber.

Alpha particles from source 102 ionize the gas in chamber 104 by stripping electrons from the gas molecules. This leaves the resulting gas molecules with a net positive charge.

The energy required to remove an electron from a molecule is about 30 electron volts (eV) per ion pair. This relationship applies substantially independent of the nature of the specific gas molecule in the chamber.

Each alpha particle with an energy of 3 MeV, therefore, will create about 100,000 ions.

The ion charge is measured under bias of an electric field. A value indicative of the number of ions is counted by detection of the charge that is produced on cathode 114, as biased by the electric field produced by electric source 110. This causes the stripped electrons to migrate toward the anode 108 and causes the positively charged ions caused by alpha gas combination to drift toward cathode 114 which forms a negative plate and collects the ions.

The ions collected by cathode 114 are measured by an integrated circuit forming an ammeter 116 which is connected between the cathode and the alpha particle source 100. The alpha particle source can be connected to the anode or cathode, or left floating.

The electric current measured in the chamber is given by:

$$I = q(E1-E2)N_c \cdot S/W \quad (1)$$

where q is the electronic charge, E1 is the initial alpha particle energy, E2 is the alpha energy when detected at the barrier, S is the number of alpha particle disintegrations/sec/$\mu$Ci, Nc is the number of $\mu$Ci, and W is the average energy deposited per ion pair.

Figure 2:
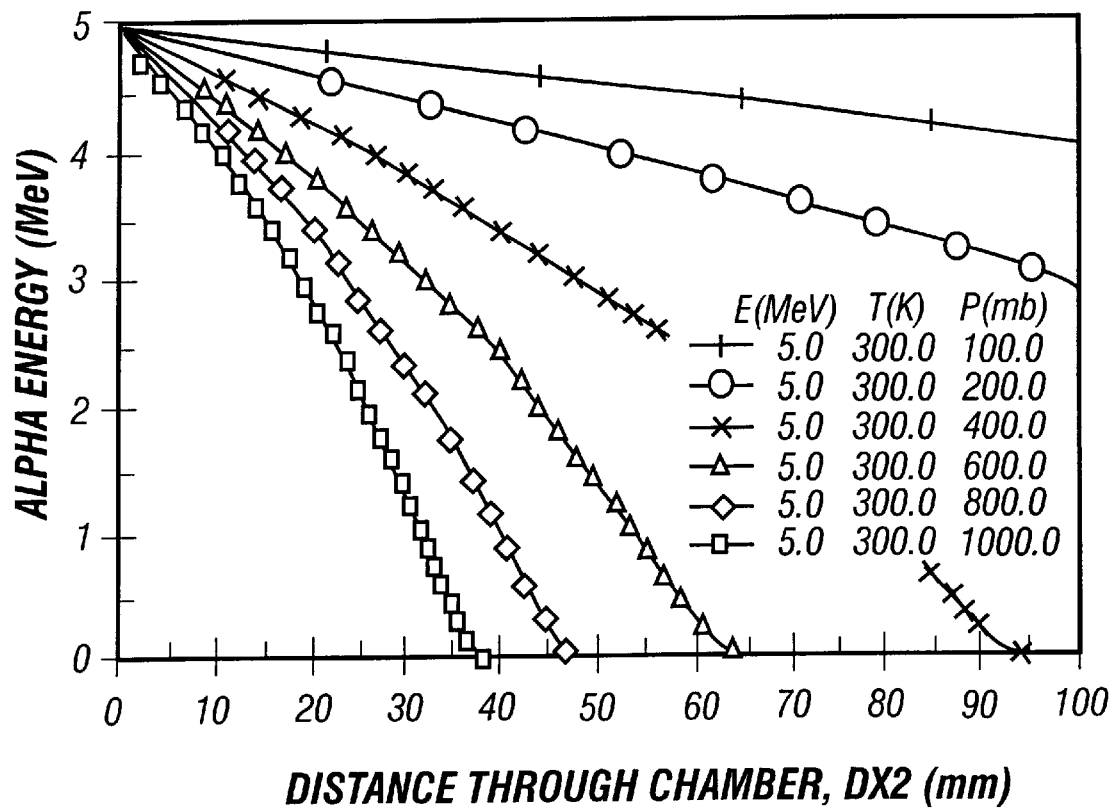
FIG. 2 shows alpha particle energy profiles.

The measurement principle is illustrated graphically with respect to the system shown in FIG. 2. The x axis in FIG. 2 represents the distance (DX2 which is shown on the scale of mm) through the chamber that the alpha particle travels between the alpha source and barrier. The y axis represents the energy of the alpha particles, and the multiple curves represent the gas pressure. It can be seen that detection of the relationship between energy and distance through the chamber will allow selection of one of the curves and hence allow detection of the pressure in the chamber.

It is important that the detector's electric field operate to separate the positively-charged ions from the electrons. The positively charged ions then migrate to the cathode 114 where they are collected. The electric field must be sufficiently strong to avoid recombination between the ions and the electrons. In this embodiment, the electric field is preferably between $10^4$ and $10^5$ V/m/atm.

Figure 10:
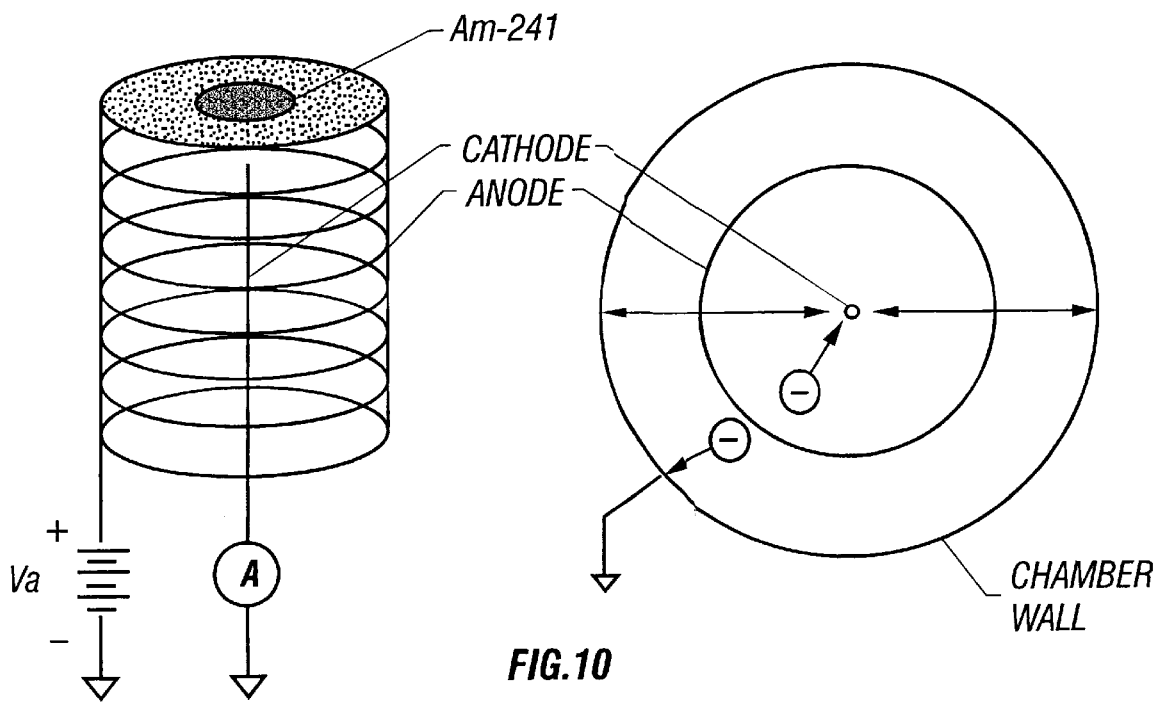
FIG. 10 shows a Bayard Alpert ionization gauge used for an electric field barrier.

The system also uses a barrier located in the range of the alpha paricles. This barrier may be a physical barrier, such as a metal or insulating plate. Alternatively, the barrier can be an electric field barrier, that prevents carriers from reaching the collecting cathode. One such electric field barrier is created using the grid like structure of FIG. 10; a so called Bayard Alpert ionization gage.

An important feature of the alpha particle detector is to maintain E2 in equation (1) as nonzero. If E2 becomes zero, the alpha particle will reach the end of its range before arriving at the barrier. All of the particle energy will be deposited in the chamber and ion current will then be constant independent of the pressure. This is shown, for example in the 800 and 1000 mb pressure curves in FIG. 2. For these pressures, the cathode would need to be placed at 30 mm for example to avoid this phenomenon.

Figure 3:
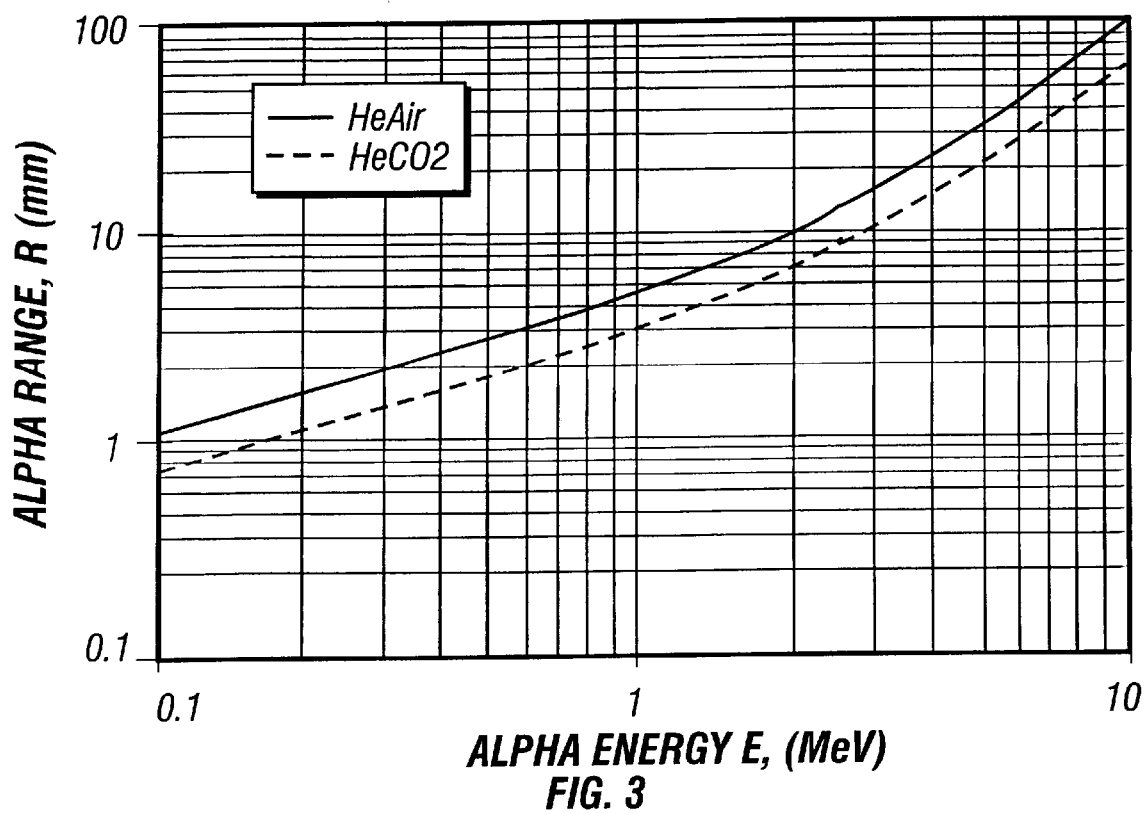
FIG. 3 shows a family of range-energy curves for air and CO2.

The functional dependence of the ion current is derived by approximating the range-energy curves for alphas in air shown in FIG. 3. The approximation is used in the following analysis:

$$E/E_i = (R/R_i)^n$$

where $n$, $E_i$ and $R_i$ are fitting parameters. The energy difference found in the ion current expression is analyzed as follows:

$$E1 - E2 = E_i(R1/R_i)^n - E_i[(R1 - DX2)/R_i]^n$$

where R1 is the range of alphas with the energy of E1. This expression can be simplified assuming $DX2/R1 \ll 1$ which leads to:

$$E1 - E2 = n \cdot E1 \cdot DX2/R1.$$

The Bragg-Kleeman rule relates the alpha range, R, to the gas density, D, as follows:

$$R/R_o = D_o/D$$

where $R_o$ is the alpha range and $D_o$ is the density at standard temperature and pressure. Thus the energy difference is:

$$E1 - E2 = n \cdot E1 \cdot DX2 \cdot D/(R_o \cdot D_o)$$

This equation shows that the energy difference is proportional to gas density, D. The density is related to temperature, T, and pressure, P, through the ideal gas law expressed relative to the standard temperature and pressure:

$$D/D_o = (P/P_o) \cdot (T_o/T)$$

where $P_o$ and $T_o$ are the temperature and pressure at standard temperature and pressure. That is, $P_o = 1013.25$ mb and $T_o = 273.15$ K. The ion current is:

$$I = [q \cdot n \cdot E1 \cdot S \cdot T_o/(W \cdot R1_o \cdot P_o)] N_c \cdot DX2 \cdot P/T$$

This expression indicates the ion current increases linearly with $N_c$, DX2, and P and inversely with T. It also indicates that the ion current is species sensitive through the $R1_o$ parameter. The $R1_o$ ratio for air and $CO_2$ is about 1.6 and is inversely proportional to the gas density ratio.

Figure 4:
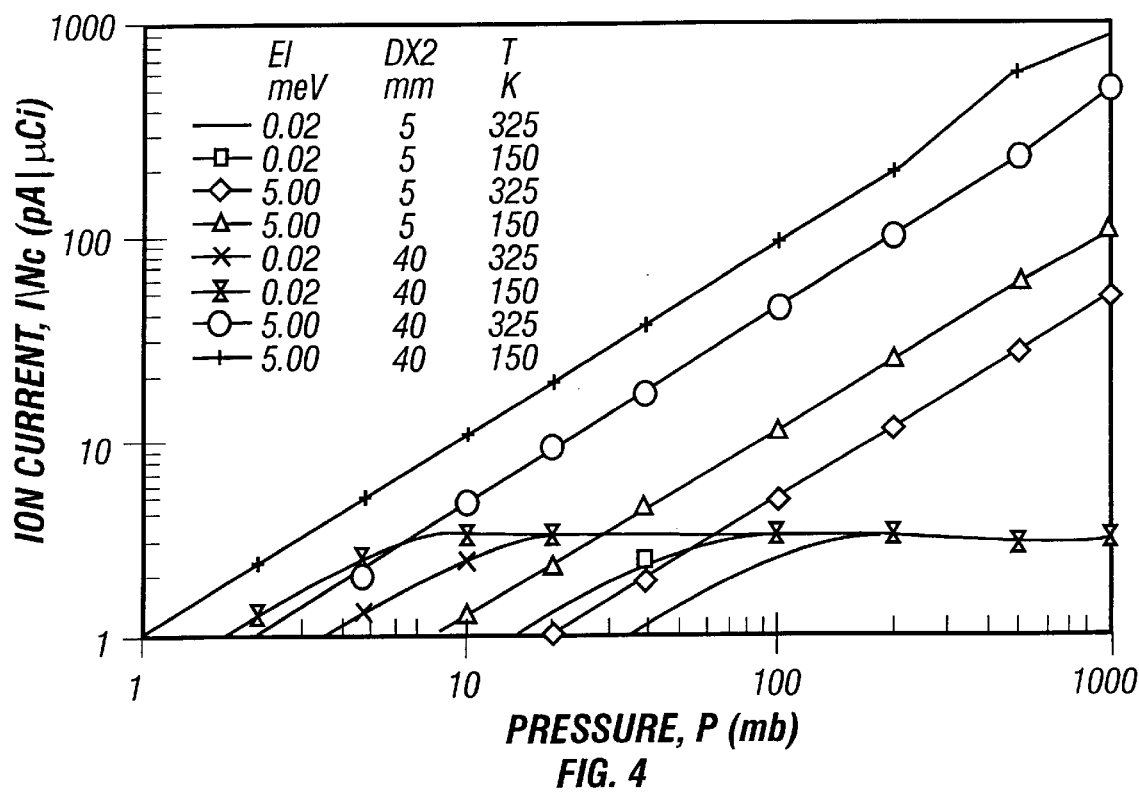
FIG. 4 shows a plot of pressure vs ion current.

The design curves are summarized in FIGS. 4–7. The ion current is a function of E1, Nc, DX2, P and T. An overview of the measurement is shown in FIG. 4 where the parameters are shown at their extreme values. The ion current increases linearly with pressure up to the point where the alphas stop in the collection region. This is indicated by the horizontal lines shown in the figure. When this condition is reached, pressure measurements are no longer possible.

Figure 5:
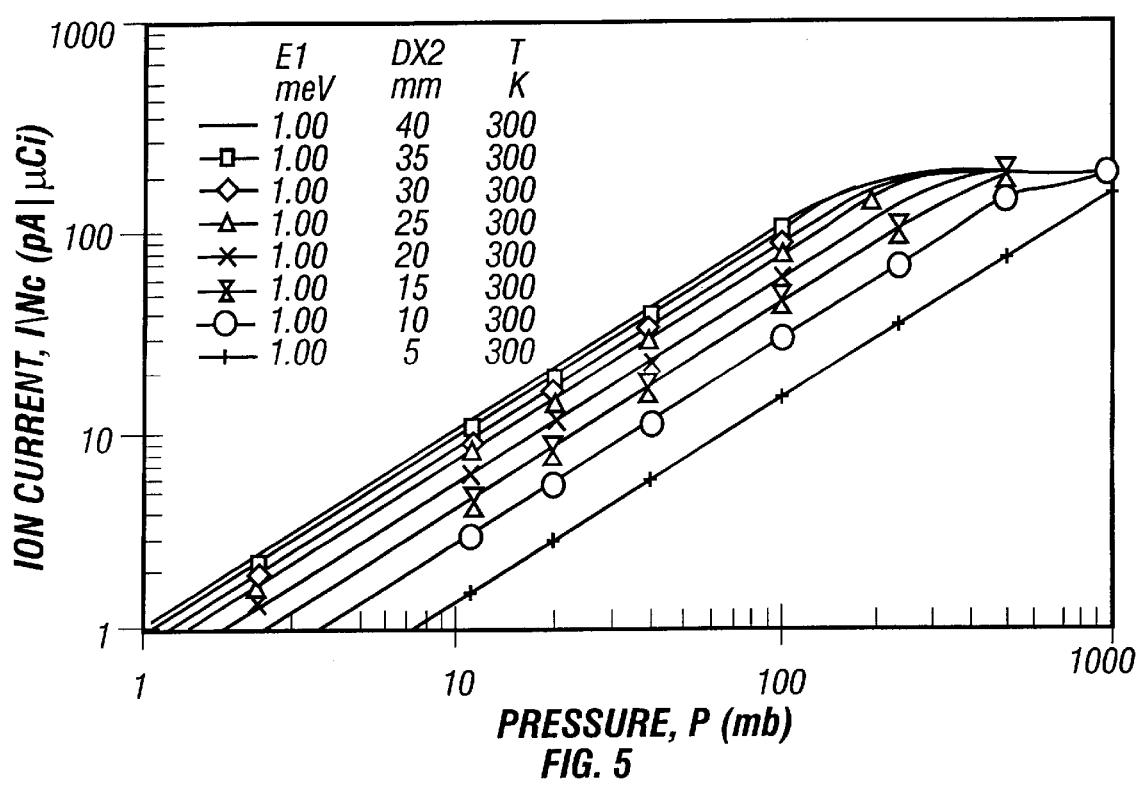
FIG. 5 shows a plot of source collector distance.
Figure 6:
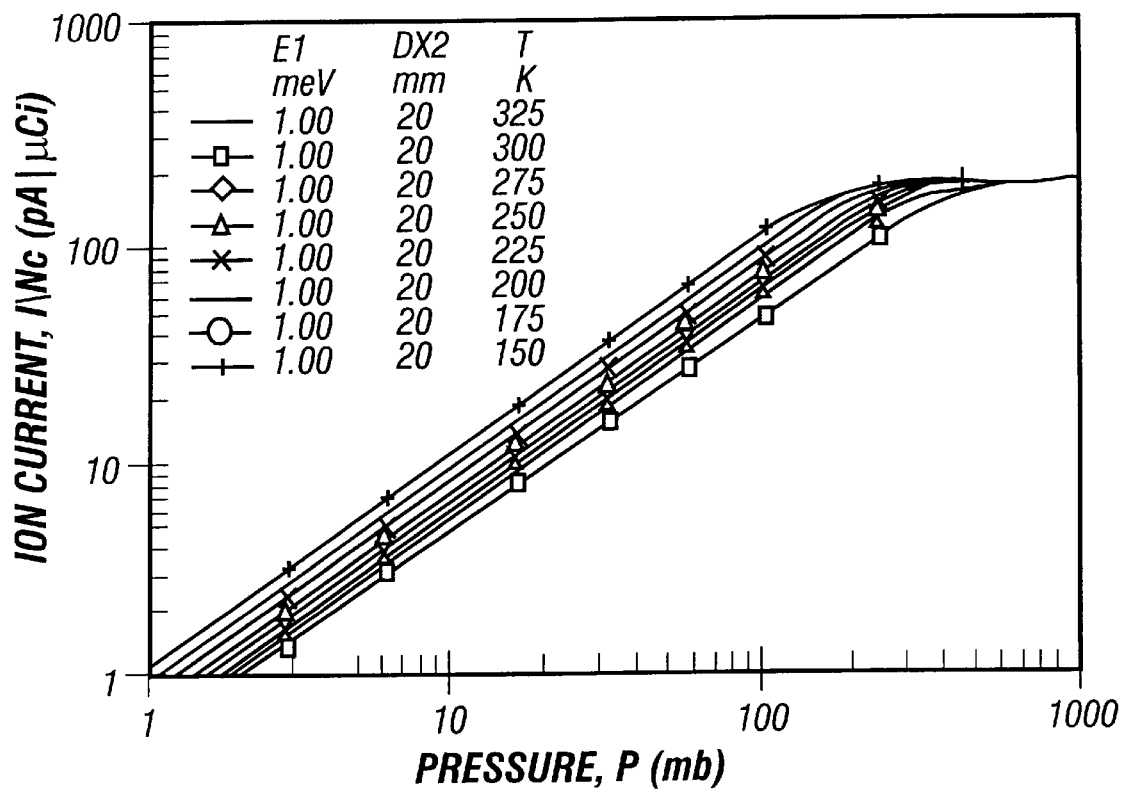
FIGS. 6, 7 and 8a–8b show temperature and alpha particle dependence of the device.

The ion current increases linearly with DX2 as shown in FIG. 5. The ion current increases inversely with temperature as shown in FIG. 6.

Figure 7:
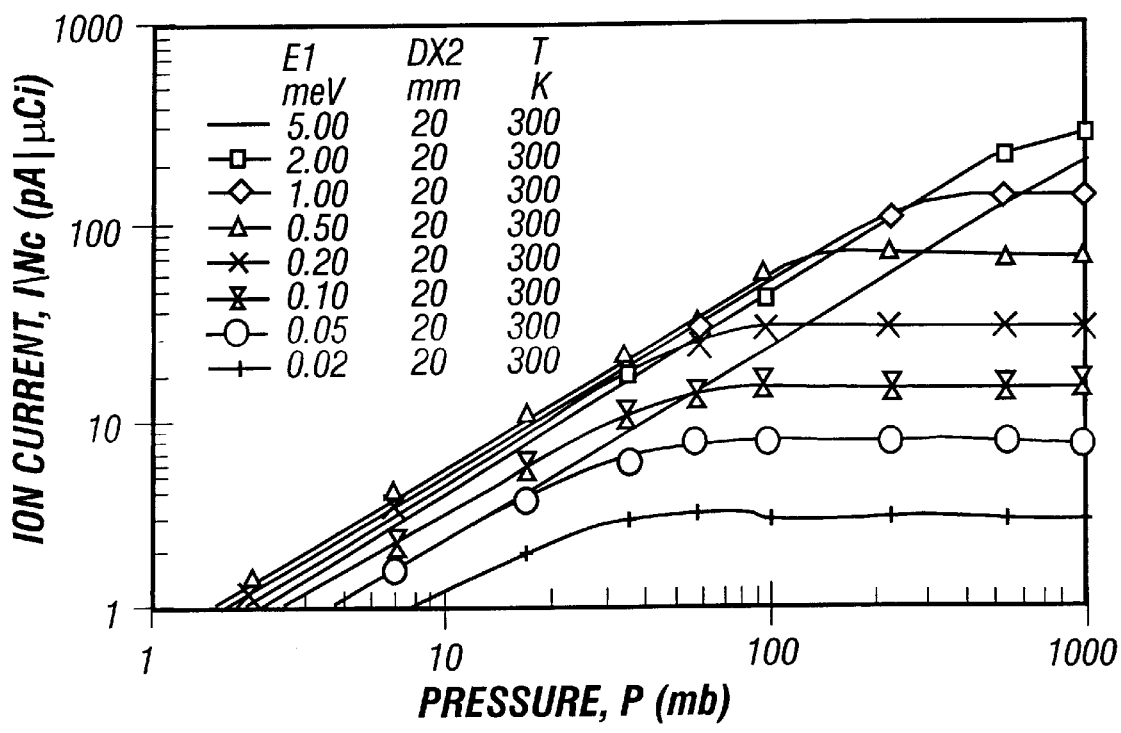

The complex ion current variation with energy is shown in FIG. 7. The ion current saturates for a given alpha energy. At this point, the detector is no longer sensitive to pressure. In the saturation region, the ions reach their end-of-range before they reach the barrier.

Figure 8A:
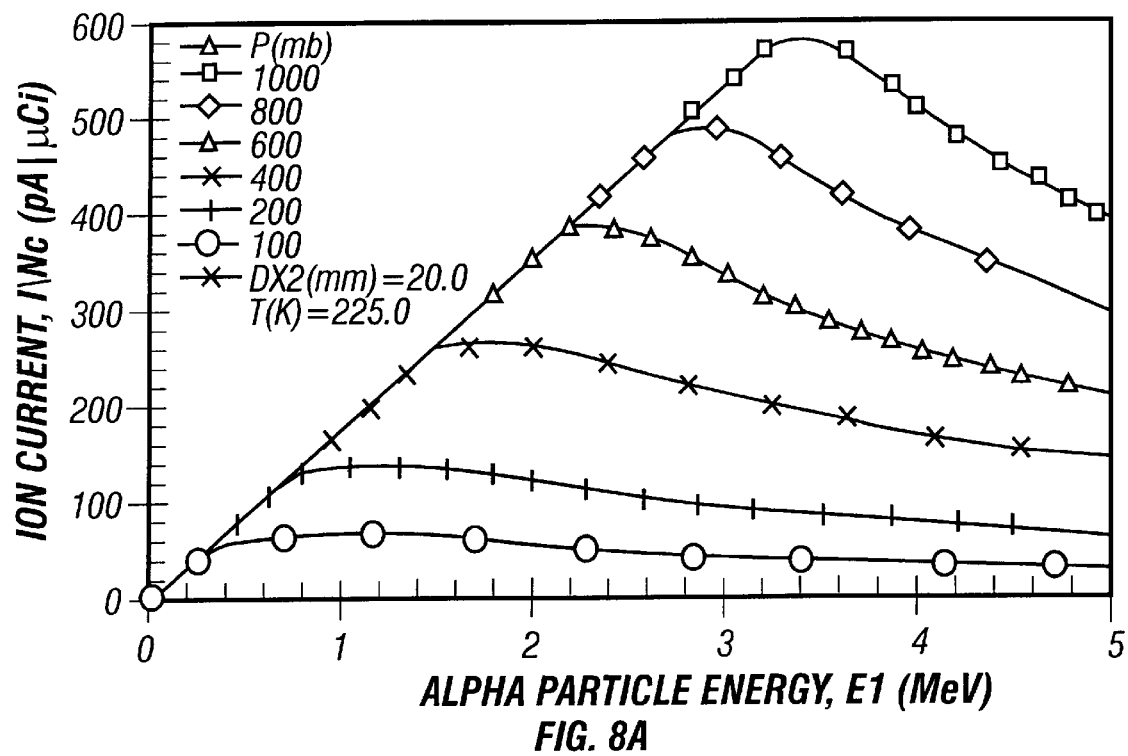
Figure 8B:
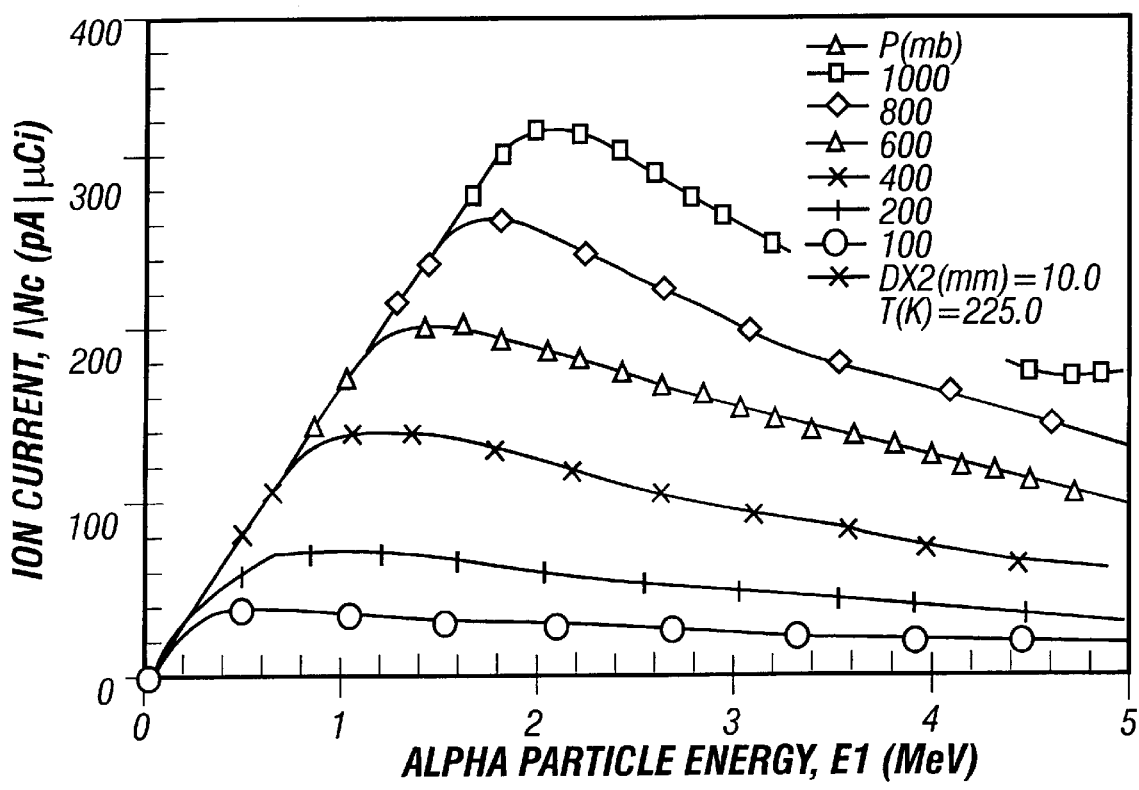

Another view is shown in FIGS. 8a and 8b. The saturation region is now represented by the upward sloping line. The peak in the ion energy is clearly shown in the figure. Because the ion current is a weak function of alpha energy, it is not necessary to operate at the energy peak.

Figure 9:
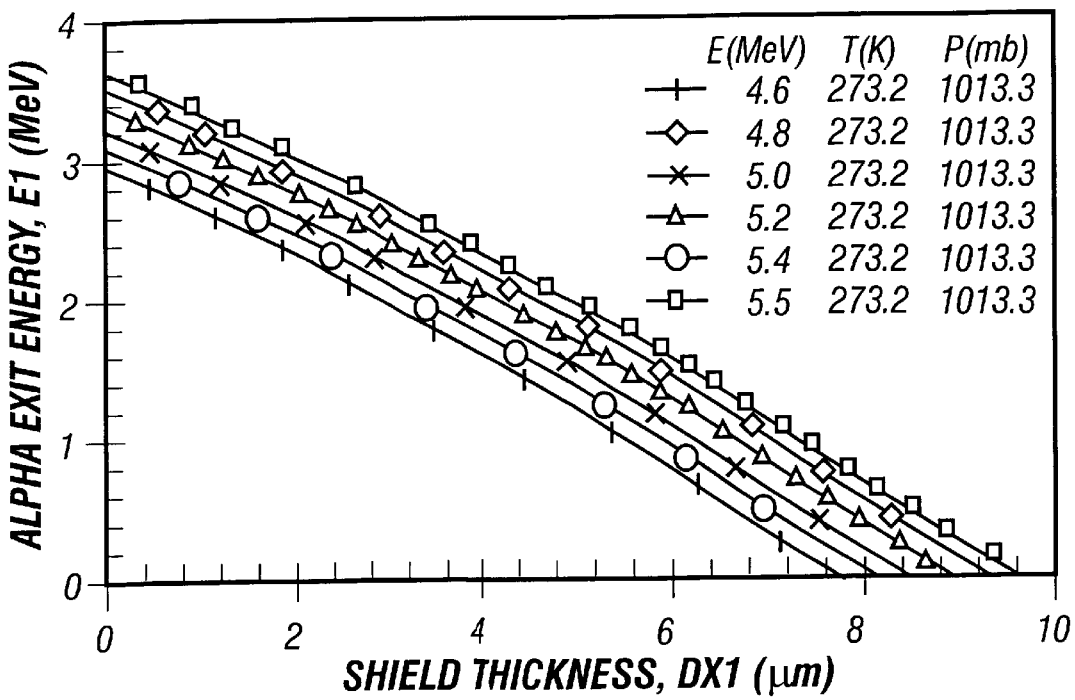
FIG. 9 shows a energy-depth profile for gold.

To get the best performance out of the pressure measurement, the energy of the alphas must be carefully selected. The alphas are easily attenuated by using an absorber such as gold. The energy profile curves for gold, for example are shown in FIG. 9.

Figure 11:
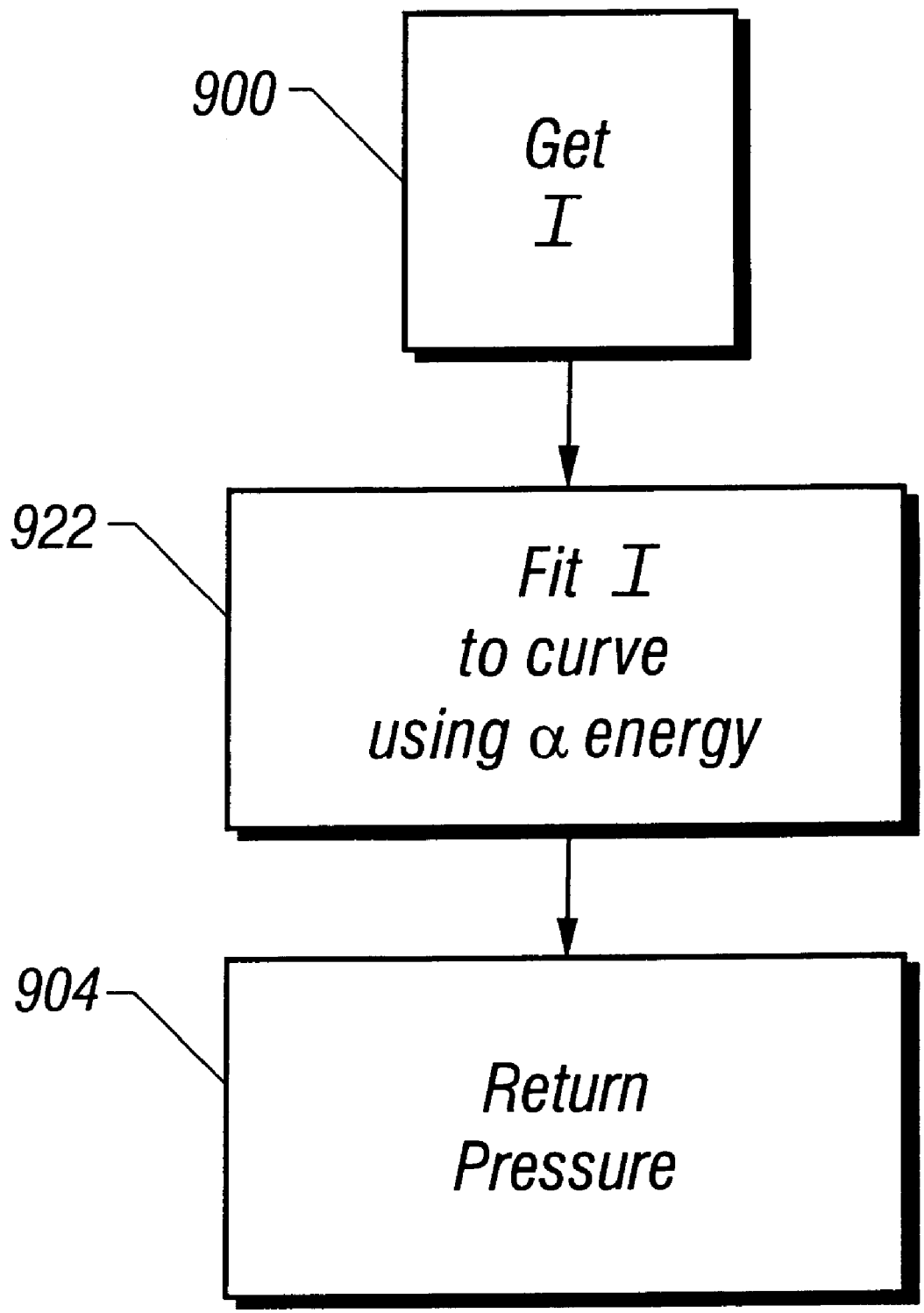
FIG. 11 shows a flowchart of operation.

The specific detection operation can be carried out using on-chip microprocessor 120 running the flowchart of FIG. 11. The processor monitors the output of ammeter 116 at step 900. At step 902, the acquired current is fit to the proper curve using the known alpha energy. The curve to which the current is fit indicates the proper current pressure. Hence, step 904 returns that pressure as a sensed value.

Other embodiments are within the disclosed invention. For example, the cathode is described herein as being formed of some kind of metal, but could alternately be formed of any current collector. All such modifications are intended to be encompassed with the following claims.

What is claimed is:

1. A gas pressure sensor comprising:
   a chamber of alpha particles, located to produce alpha particles into said chamber that ionizes a gas in said chamber whose pressure is to be detected;
   a gas ionization detection sensor, forming a plurality of predetermined gas characteristics and detecting a current gas characteristic in said chamber and matching said current gas characteristic to one of said predetermined characteristics to determine a sensed gas pressure.

2. An apparatus as in claim 1 further comprising an ionization calculating device, sensing a current indicative of gas ionization.

3. A method of determining gas pressure, comprising:
   providing alpha particles near a gas whose pressure is to be sensed and storing a plurality of prestored gas characteristics, each said characteristic corresponding to a specific gas pressure; and
   detecting characteristics of said gas in said chamber;
   matching the detected characteristic to a prestored characteristic; and
   producing a gas pressure based on said matching.

4. A method as in claim 3 wherein said sensing is carried out by determining an amount of electric charge.

* * * * *